(12) United States Patent
Hofmann

(10) Patent No.: US 11,150,073 B2
(45) Date of Patent: Oct. 19, 2021

(54) STRAIN GAUGE HAVING FIRST AND SECOND INSULATION LAYERS AND METHOD FOR PRODUCING SUCH A STRAIN GAUGE

(71) Applicant: Schaeffler Technologies AG & Co. KG, Herzogenaurach (DE)

(72) Inventor: Alexander Hofmann, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 312 days.

(21) Appl. No.: 16/320,513

(22) PCT Filed: Aug. 16, 2017

(86) PCT No.: PCT/DE2017/100689
§ 371 (c)(1),
(2) Date: Jan. 25, 2019

(87) PCT Pub. No.: WO2018/050152
PCT Pub. Date: Mar. 22, 2018

(65) Prior Publication Data
US 2019/0249978 A1    Aug. 15, 2019

(30) Foreign Application Priority Data
Sep. 15, 2016    (DE) .................. 10 2016 217 585.8

(51) Int. Cl.
*G01B 7/16* (2006.01)
*G01L 1/22* (2006.01)
*G01L 1/18* (2006.01)

(52) U.S. Cl.
CPC .............. *G01B 7/18* (2013.01); *G01L 1/18* (2013.01); *G01L 1/22* (2013.01); *G01L 1/2287* (2013.01); *G01L 1/2293* (2013.01)

(58) Field of Classification Search
None
See application file for complete search history.

(56) References Cited

U.S. PATENT DOCUMENTS 4,785,275 A * 11/1988 Adamitzki ............... G01B 7/20
338/2
5,631,622 A * 5/1997 Hauber ................ G01L 1/2287
156/233

(Continued)

FOREIGN PATENT DOCUMENTS

CN    101080619 A    11/2007
CN    101850943 A    10/2010

(Continued)

OTHER PUBLICATIONS

PhD thesis "Tool Embedded Thin-Film Microsensor Cutting Force Basic research in measurement technology" Nov. 26, 2015 D. Thesis Database in China ISSN 1674-022X CN 11-9133/G.

*Primary Examiner* — Andre J Allen
*Assistant Examiner* — Jermaine L Jenkins

(57) ABSTRACT

A strain gauge for measuring force and strain is provided that has reduced susceptibility to interfering electromagnetic fields. The strain gage includes a first insulation layer, which has a top side, a resistance element, which is arranged on the top side of the first insulation layer, a second insulation layer, which is arranged on the resistance element and which is joined to the first insulation layer at least in some sections, and an electrically conductive layer, which is arranged on the second insulation layer.

17 Claims, 3 Drawing Sheets

(56) References Cited

U.S. PATENT DOCUMENTS

| | | | |
|---|---|---|---|
| 6,345,543 | B1 | 2/2002 | Aoki |
| 6,631,646 | B1 * | 10/2003 | Maitland ............... G01L 1/2293 |
| | | | 257/E29.324 |
| 2002/0130756 | A1 | 9/2002 | Waldemar |
| 2004/0033369 | A1 | 2/2004 | James |

FOREIGN PATENT DOCUMENTS

| | | | |
|---|---|---|---|
| CN | 102004010 | A | 4/2011 |
| CN | 102783955 | A | 11/2012 |
| CN | 103047927 | A | 4/2013 |
| CN | 103257008 | A | 8/2013 |
| CN | 104272080 | A | 1/2015 |
| CN | 105370508 | A | 3/2016 |
| CN | 105424238 | A | 3/2016 |
| CN | 105783696 | A | 7/2016 |
| DE | 2916425 | B1 | 7/1980 |
| DE | 3317601 | A1 | 11/1984 |
| DE | 102005026243 | A1 | 12/2006 |
| DE | 102009027382 | A1 | 1/2011 |
| EP | 0053337 | A2 | 6/1982 |
| EP | 0129166 | A2 | 12/1984 |
| EP | 1811278 | A1 | 7/2007 |
| EP | 2933482 | A1 | 10/2015 |
| JP | 2006156946 | A | 6/2006 |

\* cited by examiner

STRAIN GAUGE HAVING FIRST AND SECOND INSULATION LAYERS AND METHOD FOR PRODUCING SUCH A STRAIN GAUGE

CROSS-REFERENCE TO RELATED APPLICATIONS

This application is the U.S. National Phase of PCT Application No. PCT/DE2017/100689 filed Aug. 16, 2017 which claims priority to DE 102016217585.8 filed Sep. 15, 2016, the entire disclosures of which are incorporated by reference herein.

TECHNICAL FIELD

This disclosure relates to a strain gauge for force and strain measurement, and to a method for producing a strain gauge.

BACKGROUND

Strain gauges (SGs) for measuring component strains are widely known. Such strain gauges are in general adhesively bonded onto a surface of a component to be examined. The strain gauge in general comprises a carrier element made of a plastic, and an electrically conductive resistance layer arranged on the carrier element. In order to protect against moisture, the resistance layer is in general protected by an outer plastic layer. The resistance layer is therefore embedded between the carrier element and the outer plastic layer.

A strain gauge is known, for example, from DE 29 16 425 B1 and DE 33 17 601.

There is a constant need to increase the measurement accuracy of strain gauges and to reduce or avoid false measurements.

SUMMARY

The object of this disclosure is to provide a strain gauge and a method for producing a strain gauge, which has an increased measurement accuracy and a reduced susceptibility to error.

The object is achieved according to the disclosure by a strain gauge having the features and method of producing described herein and illustrated in the figures. Embodiments of the disclosure, which may respectively represent an aspect of the disclosure individually or in combination, are captured in the description below.

According to the disclosure, a strain gauge for force and strain measurement, comprising a first insulation layer having an upper side, a resistance element, which is arranged on the upper side of the first insulation layer, a second insulation layer, which is arranged on the resistance element and is at least locally connected to the first insulation layer, and an electrically conductive layer arranged on the second insulation layer, is provided.

The first insulation layer and/or the second insulation layer is intended to mean a nonconductive, or insulating, layer. In one embodiment, the first insulation layer and/or the second insulation layer comprises a plastic material. In one embodiment, the first insulation layer and/or the second insulation layer comprises silicon dioxide $SiO_2$ and/or silicon nitride ($Si_3N_4$) and/or aluminum oxide $Al_2O_3$. In one embodiment, the first insulation layer comprises the same material as the second insulation layer. The first insulation layer can be configured in a different way to the second insulation layer.

The resistance element can be a resistance wire and/or a resistance foil and/or a resistance layer. In one embodiment, the resistance element comprises germanium and/or silicon. The resistance element can have a round and/or rectangular cross section. In one embodiment, the resistance wire is deposited from the gas phase and/or produced by means of chemical vapor deposition (CVD). The resistance wire can be machined from a flat structure by a laser. In one embodiment, the resistance wire comprises a meandering structure and/or meandering patterning in one or more loops.

The electrically conductive layer is intended to mean any layer for shielding electromagnetic radiation. In one embodiment, the electrically conductive layer is a conductive film, in particular a metal foil, and/or a metal layer.

In order to detect a component strain and/or a force, or a torque, the resistance value of the strain gauge arranged on the component is measured. If the component to be examined experiences a strain, for example due to an external force action, the resistance layer is likewise strained so that the resistance value of the resistance layer changes correspondingly. The resistance value is measured by applying an electrical voltage. In this disclosure, use is made of the discovery that strain electromagnetic fields in the vicinity of the strain gauge may have an influence on the applied voltage and therefore an influence on the resistance value measured, so that the measurement result is adversely affected. An electrically conductive layer, which provides shielding for the resistance element, is therefore arranged on the second insulation layer. The electrically conductive layer is not electrically conductively connected to the resistance layer. In this way, electromagnetic rays in the vicinity of the strain gauge can be shielded from the resistance element by the electrically conductive layer, so that the influence of interfering electromagnetic effects during the measurement of the resistance value of the resistance element can be reduced, and the measurement accuracy of the strain gauge can therefore be increased.

According to one embodiment, the electrically conductive layer has a base area $A_1$ and the resistance element has a base area $A_2$, the relation $A_1 \geq A_2$ being satisfied. The base area $A_1$ of the electrically conductive layer is therefore greater than or equal to the base area $A_2$ of the resistance element. In this way, the electrically conductive layer can fully cover the resistance element. In one embodiment, the base area $A_1$ of the electrically conductive layer is greater than the base area $A_2$ of the resistance element, and arranged relative to the base area $A_2$ of the resistance element in such a way that the base area $A_1$ of the electrically conductive layer protrudes at least locally, and possibly fully, beyond the base area $A_2$ of the resistance element.

In principle, the base area $A_1$ of the electrically conductive layer may be less than or equal to a base area $A_3$ of the first insulation layer. In one embodiment, provision is made that the base area $A_1$ of the electrically conductive layer is greater than the base area $A_3$ of the first insulation layer. In this way, the electrically conductive layer can be arranged relative to the first insulation layer in such a way that the electrically conductive layer protrudes at least locally, and, in one embodiment, fully, beyond the first insulation layer at the side regions of the first insulation layer. The electrically conductive layer may be electrically conductively connected by the regions which protrude beyond the first insulation layer to a base body on which the strain gauge is arranged.

According to one embodiment of the disclosure, the resistance element is arranged in a pattern on the upper side of the first insulation layer, so that sections covered by the resistance element and resistance element-free sections are formed on the upper side. In the resistance element-free sections, the second insulation layer is in direct contact with the upper side of the first insulation layer. In one embodiment, the resistance element-free sections are formed in an edge region of the upper side of the first insulation layer and/or between resistance element-covered sections. In this way, the resistance element is framed between the first insulation layer and the second insulation layer so that the resistance element can be protected against external influences, particularly against liquid media and/or humid media.

According to one embodiment, the resistance element has meandering patterning. The resistance element may comprise of one or more loops on the upper side of the first insulation layer. Resistance element-free sections can therefore be formed between the loops of the meandering patterning and/or in the edge region of the first insulation layer.

According to one embodiment, the first insulation layer has a lower side on a side facing away from the surface, the second insulation layer has an outer side on a side facing away from the surface of the first insulation layer, the first insulation layer and the second insulation layer have at least one continuous material recess, which extends from the outer side of the second insulation layer to the lower side of the first insulation layer and is arranged in the resistance element-free section, and the conductive layer is arranged on the outer side of the second insulation layer and in the continuous material recess, and extends as far as the lower side of the first insulation layer. In this way, the electrically conductive layer can extend from the outer side to the lower side of the first insulation layer in the resistance element-free section. In one embodiment, the strain gauge comprises a multiplicity of continuous material recesses, which are arranged from the outer side to the lower side in the resistance element-free sections. If the strain gauge is applied on a metallic base body, the electrically conductive layer can be electrically conductively connected to the base body and form a Faraday cage around the resistance element. In this way, the shielding effect against electromagnetic interference can be increased.

In one embodiment, the resistance element comprises contact elements for electrical contacting of the resistance element, and the second insulation layer and the electrically conductive layer are recessed in the region of the contact elements. In this way, the resistance element can be supplied with electrical voltage through the contact elements.

This disclosure furthermore provides a method for producing a strain gauge, the strain gauge comprising a first insulation layer having an upper side, a resistance element, which is arranged on the upper side of the first insulation layer, a second insulation layer, which is arranged on the resistance element and is at least locally connected to the first insulation layer, and an electrically conductive layer arranged on the second insulation layer, comprising the steps:

a) applying a first insulation layer onto a surface to be examined of a base body, a lower side of the first insulation layer being in contact with the base body;

b) applying a resistance element, comprising contact elements, on an upper side of the first insulation layer, the upper side being arranged on a side facing away from the lower side;

c) applying a second insulation layer onto the resistance element;

d) applying an electrically conductive layer onto the second insulation layer.

An electrically conductive layer is therefore applied on the second insulation layer. The electrically conductive layer is not electrically conductively and/or not electrically conductively connected to the resistance element. This means that an insulating layer, namely the second insulation layer, is arranged between the electrically conductive layer and the resistance element. The electrically conductive layer can therefore act as shielding for the resistance element against stray electromagnetic fields which may have an influence on the measurement result in the vicinity of the strain gauge.

According to one embodiment, the first insulation layer is vapor-deposited onto the surface of a metallic base body. In this way, a thin film-like first insulation layer may be applied onto the surface. In one embodiment, the first insulation layer is applied with a material thickness of <1 µm onto the metallic base body.

According to one embodiment, the resistance element is applied with a pattern onto the first insulation layer, so that the first insulation layer comprises a section covered by a resistance element and a resistance element-free section. The resistance element-free section may be formed in an edge region of the upper side of the first insulation layer. Depending on the patterning of the resistance element, one or more resistance element-free sections may be arranged at least locally between the sections covered by the resistance element. In one embodiment, the resistance element has meandering patterning, which can include one or more loops.

In principle, the resistance element may be a resistance wire which is adhesively bonded onto the first insulation layer. According to one embodiment, the resistance element is produced by applying a resistance layer onto the first insulation layer, and patterning the resistance layer by etching.

According to one embodiment, the resistance element is vapor-deposited in a pattern onto the first insulation layer, and/or applied in a pattern by sputtering. In this way, the resistance element may be applied with a material thickness of <1 µm onto the first insulation layer.

According to one embodiment, the contact elements of the resistance element are masked before the application of the second insulation layer. The masking can prevent coating of the contact elements with the second insulation layer. It can also prevent the contact elements from being short-circuited by the electrically conductive layer. For electrical contacting of the contact elements, the masking is removed after the application of the electrically conductive layer.

According to one embodiment, the base body masking is applied onto the surface of the metallic base body in the resistance element-free section before the application of the first insulation layer, and the base body masking is removed before the application of the electrically conductive layer. In this way, the base body masking can prevent a first insulation layer from being applied directly on to the surface in the regions of the base body masking. By the removal of the base body masking after the application of the second insulation layer, a continuous material recess is provided in the first insulation layer and the second insulation layer. In this way, by the application of the electrically conductive layer onto the second insulation layer, material of the electrically conductive layer can enter into the continuous material recess as far as the base body, so that an electrically conductive connection can be established between the electrically conductive layer and the metallic base body.

Lastly, according to one embodiment, at least one continuous material recess is formed in the resistance element-free section, possibly by etching, before the application of the electrically conductive layer.

BRIEF DESCRIPTION OF THE DRAWINGS

This disclosure will be explained by way of example below with reference to the appended drawings with the aid of example embodiments, in the context of which the features presented below may represent an aspect of the disclosure respectively individually and in combination. In the figures.

DETAILED DESCRIPTION

Figure 1:
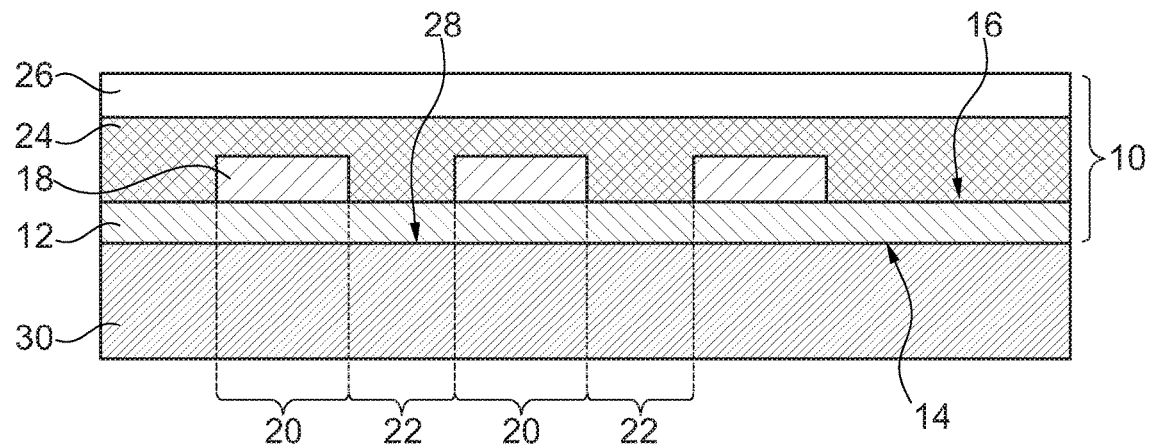
FIG. 1 shows a vertical section through a strain gauge according to one embodiment.

FIG. 1 shows a vertical section through a strain gauge (SG) 10. The strain gauge 10 comprises a first insulation layer 12, which has a lower side 14 and an upper side 16 on a side facing away from the lower side 14. A resistance element 18 is arranged on the upper side 16 of the first insulation layer 12, the resistance element 18 comprising contact elements (not represented) for electrical contacting of the resistance element 18.

The resistance element 18 is arranged in a pattern on the surface 16 of the first insulation layer 12, so that sections 20 covered by the resistance element 18 and resistance element-free sections 22 are formed on the upper side 16. In the present case, the resistance element 18 is configured in a meandering shape. Resistance element-free sections 22 are therefore formed on the upper side 16 of the first insulation layer 12 in an edge region on the upper side 16 and at least locally between the loops of the meandering resistance element 18.

A second insulation layer 24, which is connected in the resistance element-free sections 22 to the upper side 16 of the first insulation layer 12, is arranged on the resistance element 18. An electrically conductive layer 26 is arranged on the second insulation layer 24. The electrically conductive layer 26 is configured as a metal layer. Electromagnetic rays in the vicinity of the strain gauge 10, which may have an interfering effect on the voltage introduced into the resistance element 18 through the contact elements, are shielded by the electrically conductive layer. In this way, the interfering effect of electromagnetic rays when measuring the resistance value of the resistance element 18 can be reduced.

The SG 10 is arranged with the lower side 14 on a surface 28 of a metallic base body 30.

Figure 2:
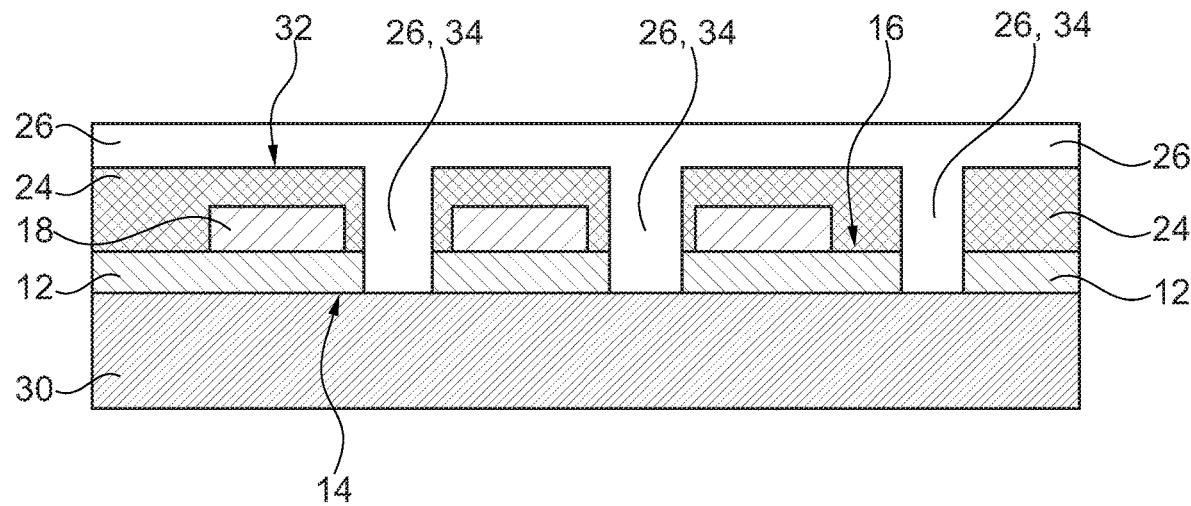
FIG. 2 shows a vertical section through a strain gauge, a continuous material recess being formed in a first insulation layer and a second insulation layer, according to one embodiment.

FIG. 2 shows the SG 10 known from FIG. 1. The second insulation layer 24 has an outer side 32 on a side facing away from the upper side 16 of the first insulation layer 12. In contrast to the SG 10 known from FIG. 1, in the resistance element-free sections 22 the SG 10 shown in FIG. 2 comprises continuous material recess 34 which extend from the outer side 32 of the second insulation layer 24 to the lower side 14 of the first insulation layer 12. The conductive layer 26 is arranged on the outer side 32 of the second insulation layer 24 and is formed in the continuous material recesses 34. The conductive layer 26 therefore extends in the continuous material recesses 34 from the outer side 32 of the second insulation layer 24 to the lower side 14 of the first insulation layer 12. There is not an electrically conductive connection of the electrically conductive layer 26 to the resistance element 18.

The strain gauge 10 is arranged with the lower side 14 on the metallic base body 30. The electrically conductive layer 26, which is arranged in the continuous material recesses 34 and extends as far as the lower side 14, is therefore electrically conductively connected to the metallic base body 14. In this way, the base body 30 and the electrically conductive layer 26 form a Faraday cage which is formed around the resistance element 18. The Faraday cage can increase the effect of the shielding against electromagnetic interference.

Figure 3:
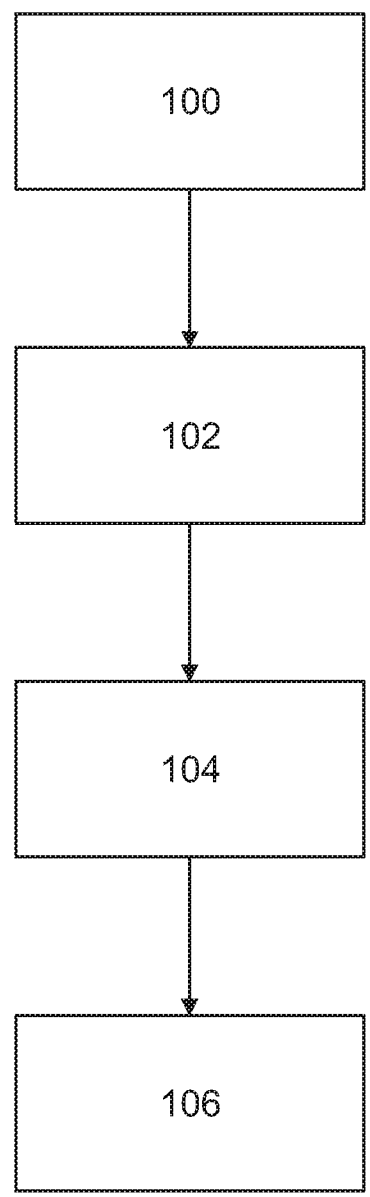
FIG. 3 shows a method for producing a strain gauge, according to one embodiment.

FIG. 3 represents a method for producing a strain gauge 10.

The method comprises the step of applying a first insulation layer 100 onto a surface to be examined of a metallic base body. The first insulation layer comprises a material of a nonconductive material and is vapor-deposited onto the surface. The first insulation layer has a lower side which is connected to the surface of the metallic base body. In this way, the first insulation layer can be applied with a thickness of <1 μm onto the surface of the metallic base body.

In a second step, the application of a resistance element 102 comprising contact elements on an upper side of the first insulation layer is carried out, the upper side being arranged on a side of the first insulation layer facing away from the lower side. The resistance element is vapor-deposited in a meandering shape onto the upper side of the first insulation layer. In this way, the upper side of the first insulation layer comprises resistance element-free sections and resistance element-covered sections.

In a third step, the application of a second insulation layer onto the resistance element 104 is carried out, the second insulation layer being connected to the upper side of the first insulation layer in the resistance element-free sections. The second insulation layer comprises a nonconductive material and is vapor-deposited onto the resistance element, and in the resistance element-free sections onto the surface of the first insulation layer. The resistance element is therefore arranged between the first insulation layer and the second insulation layer.

In a fourth step, the application of an electrically conductive layer 106 onto the second insulation layer is carried out. The second conductive layer is a metal layer which has a shielding effect against electromagnetic interference fields from a vicinity of the strain gauge.

Figure 4:
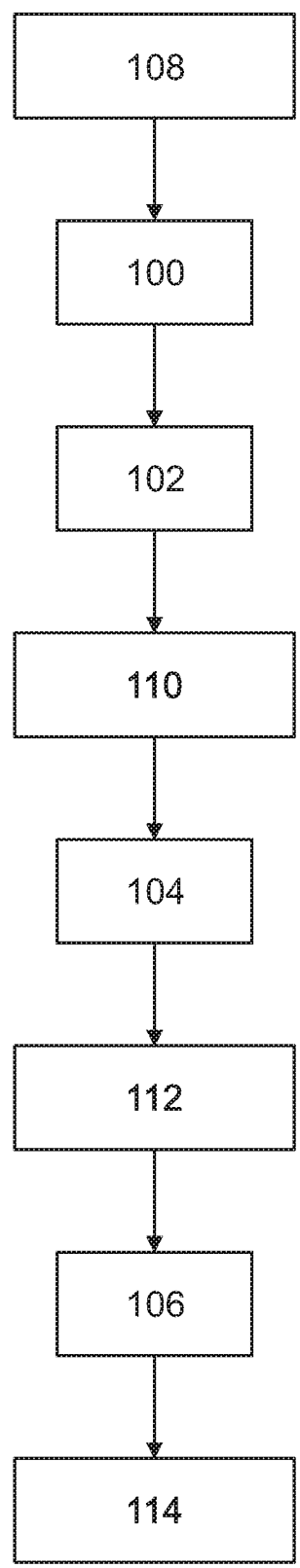
FIG. 4 shows a further method for producing a strain gauge, according to one embodiment.

FIG. 4 shows the method known from FIG. 3 for producing the strain gauge, the method known from FIG. 3 comprising further production steps.

Before the application of the first insulation layer 100, base body masking is applied 108 onto the surface of the metallic base body in the resistance element-free section. In this way, the base body masking can prevent a first insulation layer from being applied directly onto the surface of the metallic base body in the regions of the base body masking.

In a further step, the contact elements of the resistance element are masked 110 before the application of the second insulation layer. The masking can prevent coating of the contact elements with the second insulation layer. It can likewise prevent the electrical contacts from being short-circuited by the electrically conductive layer.

The application of the second insulation layer 104 is followed by removal of the base body masking 112. By the removal of the base body masking 112, a continuous material recess is produced in the first insulation layer and the second insulation layer.

The electrically conductive layer is applied onto the second insulation layer 106. In the region of the continuous material recess, the electrically conductive layer may be electrically conductively connected to the metallic base body. In this way, a Faraday cage can be formed by the metallic base body and the electrically conductive layer.

After the application of the second insulation layer 106, the masking of the contact elements is removed 114, so that the contact elements can be contacted with an electrical conductor in order to apply an electrical voltage to the resistance element.

LIST OF REFERENCE CHARACTERS 10 strain gauge
12 first insulation layer
14 lower side
16 upper side
18 resistance element
20 resistance element-covered section
22 resistance element-free section
24 second insulation layer
26 electrically conductive layer
28 surface
30 base body
32 outer side
34 material recess
100 application of first insulation layer
102 application of resistance element
104 application of second insulation layer
106 application of electrically conductive layer
108 application of base body masking
110 application of contact masking
112 removal of base body masking
114 removal of contact masking

The invention claimed is:

1. A strain gauge for force and strain measurement, comprising:
   a first insulation layer having an upper side and a lower side,
   a resistance element arranged in a pattern on the upper side of the first insulation layer, forming at least one resistance element section and at least one resistance element-free section on the upper side,
   a second insulation layer arranged on the resistance element, the second insulation layer at least locally connected to the first insulation layer, the second insulation layer has an outer side on a side facing away from the upper side of the first insulation layer, the first insulation layer and the second insulation layer have at least one continuous material recess, which extends from the outer side of the second insulation layer to the lower side of the first insulation layer and is arranged in the at least one resistance element-free section, and
   an electrically conductive layer arranged on the outer side of the second insulation layer in the continuous material recess.

2. The strain gauge as claimed in claim 1, wherein the resistance element has meandering patterning.

3. The strain gauge as claimed in claim 1, wherein at least one of the first insulation layer or the second insulation layer comprises a plastic material.

4. The strain gauge as claimed in claim 1, wherein at least one of the first insulation layer or the second insulation layer comprises at least one of silicon dioxide, silicon nitride or aluminum oxide.

5. The strain gauge as claimed in claim 1, wherein the first insulation layer comprises a same material as the second insulation layer.

6. The strain gauge as claimed in claim 1, wherein the resistance element comprises at least one of germanium or silicon.

7. The strain gauge as claimed in claim 1, wherein a base area of the electrically conductive layer is greater than or equal to a base area of the resistance element.

8. A strain gauge as claimed in claim 1, wherein a base area of the electrically conductive layer is greater than a base area of the first insulation layer.

9. A strain gauge as claimed in claim 1, wherein the electrically conductive layer is a metal foil.

10. A method for producing a strain gauge, comprising:
    a) applying a first insulation layer onto a surface to be examined of a base body, a lower side of the first insulation layer being in contact with the base body;
    b) applying the resistance element, comprising contact elements, on an upper side of the first insulation layer, the upper side being arranged on a side facing away from the lower side;
    c) applying a second insulation layer onto the resistance element such that the second insulation layer is at least locally connected to the first insulation layer; and,
    d) applying an electrically conductive layer onto the second insulation layer.

11. The method as claimed in claim 10, wherein the first insulation layer is applied to a surface of a metallic base body by a vapor-deposition process.

12. The method as claimed in claim 10, wherein the resistance element is applied in a pattern onto the first insulation layer by at least one of a vapor-deposition process or a sputtering process, forming at least one resistance element-covered section and at least one resistance element-free section on the first insulation layer.

13. The method as claimed in claim 12, wherein base body masking is applied onto the surface of the base body in the at least one resistance element-free section of the first insulation layer before application of the first insulation layer, and the base body masking is removed before the application of the electrically conductive layer.

14. The method as claimed in claim 12, wherein at least one continuous material recess is formed in the at least one resistance element-free section of the first insulation layer by etching before application of the electrically conductive layer.

15. The method as claimed in claim 12, wherein the first insulation layer has a material thickness less than one micrometer.

16. The method as claimed in claim 10, wherein the contact elements of the resistance element are masked before application of the second insulation layer.

17. A strain gauge configured to be attached to a metallic base body, comprising:
    a first insulation layer having an upper side and a lower side arranged on the metallic base body;
    a resistance element arranged on the upper side of the first insulation layer;
    a second insulation layer arranged on the resistance element, the second insulation layer at least locally connected to the first insulation layer; and, an electrically conductive layer arranged on the second insulation layer, the electrically conductive layer configured to form a Faraday cage with the metallic base body around the resistance element.

* * * * *